(12) United States Patent
Driessen

(10) Patent No.: US 9,415,790 B2
(45) Date of Patent: Aug. 16, 2016

(54) DEVICE AND ASSEMBLY FOR TRANSPORTING A CHILD, SUCH AS A PRAM AND/OR BUGGY

(71) Applicant: MUTSY B.V., Goirle (NL)

(72) Inventor: Franciscus Johannes Cornelius Driessen, Goirle (NL)

(73) Assignee: MUTSY B.V. (NL)

( * ) Notice: Subject to any disclaimer, the term of this patent is extended or adjusted under 35 U.S.C. 154(b) by 0 days.

(21) Appl. No.: 14/380,440

(22) PCT Filed: Feb. 22, 2013

(86) PCT No.: PCT/NL2013/050113
§ 371 (c)(1),
(2) Date: Aug. 22, 2014

(87) PCT Pub. No.: WO2013/125957
PCT Pub. Date: Aug. 29, 2013

(65) Prior Publication Data
US 2015/0076794 A1    Mar. 19, 2015

(30) Foreign Application Priority Data
Feb. 22, 2012    (NL) ..................................... 2008330

(51) Int. Cl.
*B62B 7/08*    (2006.01)
*B62B 7/10*    (2006.01)
*B62B 7/14*    (2006.01)
(Continued)

(52) U.S. Cl.
CPC . *B62B 7/10* (2013.01); *B62B 7/062* (2013.01); *B62B 7/08* (2013.01); *B62B 7/145* (2013.01); *B62B 9/20* (2013.01); *B62B 7/064* (2013.01); *B62B 2205/18* (2013.01)

(58) Field of Classification Search
CPC ............ B62B 7/04; B62B 7/06; B62B 7/062; B62B 7/08; B62B 7/14; B62B 7/142; B62B 7/145; B62B 9/12; B62B 9/28; B62B 7/10
See application file for complete search history.

(56) References Cited

U.S. PATENT DOCUMENTS

| 803,292 | A | * | 10/1905 | Keefer ............................ 403/62 |
| 4,544,178 | A | * | 10/1985 | Al-Sheikh et al. ............. 280/642 |
| 6,102,431 | A | * | 8/2000 | Sutherland et al. ........... 280/642 |

(Continued)

FOREIGN PATENT DOCUMENTS

| DE | 202005008211 U1 | 10/2005 |
| WO | 2007134185 A2 | 11/2007 |
| WO | 2010040644 A1 | 4/2010 |

OTHER PUBLICATIONS

International Search Report and Written Opinion mailed Jun. 10, 2013 (PCT/NL2013/050113); ISA/EP.

(Continued)

*Primary Examiner* — Frank Vanaman
(74) *Attorney, Agent, or Firm* — Banner & Witcoff, Ltd.

(57) ABSTRACT

A device and assembly for transporting a child, such as a pram and/or buggy. The pram comprises two wheel-bearing arms which are pivotally coupled by a coupling housing. One of these arms is pivotally connected to a connector element for coupling to, for instance, a child's seat. The pram further comprises a transmission between the connector element and the other arm for the purpose of rotating the connector element during said pivoting of the pram from the folded-open position to the collapsed position.

20 Claims, 6 Drawing Sheets

(51) Int. Cl.
   *B62B 7/06*      (2006.01)
   *B62B 9/20*      (2006.01)

(56) References Cited

U.S. PATENT DOCUMENTS

| | | | |
|---|---|---|---|
| 6,220,621 B1* | 4/2001 | Newton | 280/650 |
| 6,513,827 B1* | 2/2003 | Barenbrug | 280/648 |
| 7,032,922 B1 | 4/2006 | Lan | |
| 2003/0057680 A1 | 3/2003 | Lan | |
| 2006/0061066 A1* | 3/2006 | Tan | 280/642 |
| 2009/0102162 A1* | 4/2009 | Chen | 280/642 |
| 2009/0194973 A1* | 8/2009 | Wang | 280/642 |
| 2013/0257019 A1* | 10/2013 | Eisinger | 280/650 |

OTHER PUBLICATIONS

International Preliminary Report on Patentability mailed Apr. 15, 2014 (PCT/NL2013/050113); ISA/EP.

* cited by examiner

DEVICE AND ASSEMBLY FOR TRANSPORTING A CHILD, SUCH AS A PRAM AND/OR BUGGY

CROSS-REFERENCE TO RELATED APPLICATIONS

The present application is a U.S. National Phase of International Application No. PCT/NL2013/050113, filed on Feb. 22, 2013, designating the United States of America and claiming priority to NL 2008330, filed Feb. 22, 2012. The present application claims priority to and the benefit of the above-identified applications, each of which is incorporated by reference herein in its entirety.

TECHNICAL FIELD

The present invention relates to a device and assembly for transporting a child, such as a pram and/or buggy.

BACKGROUND

Devices and assemblies for transporting a child are already known. An example hereof is the pram marketed under the name "Mutsy Transporter" by the applicant of the present patent application. This pram comprises a first wheel-bearing arm, an end of which is connected in bearing-mounted manner to a first wheel and another end of which is fixedly connected to a coupling housing, and comprises a second wheel-bearing arm, an end of which is connected in bearing-mounted manner to a second wheel and another end of which is coupled pivotally to the coupling housing.

The known device also comprises a connector device comprising a connector element configured for releasable coupling to a supporting device for a child such as a carrycot, a child's seat or a car seat. This connector is connected fixedly to the first arm.

The known device further comprises a push bar for pushing the device along, which push bar is coupled pivotally at an end to the coupling housing. The device is pivotable here between a collapsed position, wherein the second arm and the push bar are rotated toward the first arm for the purpose of reducing a distance between the first and second wheel and for reducing the space taken up by the device, and a folded open position corresponding to a position of use for the purpose of transporting the child.

In a pram with this configuration a relatively large amount of pressure is exerted on the coupling housing. This is because the weight of for instance a child in combination with a carrycot presses the first and second arms away from each other. The coupling housing therefore has to take a relatively heavy form and/or it is susceptible to wear.

A further drawback of the known device lies in the fact that, for the purpose of effective storing or transport of the pram, the carrycot or other supporting device for the child has to be detached from the pram. In the known device it is thus not possible, or hardly so, to effectively transport as one whole the collapsed pram in combination with the carrycot or other supporting device. This is particularly important if the pram has to be transported by car. The volume taken up in the collapsed state is of great importance in such situations.

DE 20 2005 008 211 likewise describes a collapsible pram. This pram comprises a connector for attaching a seat part, the connector being pivotally mounted on a rigid connection between a first and second wheel-bearing arm. The first and second arm can pivot toward each other here. The first arm, which carries a bearing-mounted rear wheel, is pivotally connected to a connecting sleeve. This sleeve is fixedly connected to a push bar. Another end of the sleeve is pivotally connected to the second arm, which carries a bearing-mounted front wheel. This achieves that, in contrast to the push bar, the first arm and second arm can pivot relative to the sleeve. Owing to the two-sided pivoting connection the orientation and mutual spacing between the first and second arm can be changed during collapsing. A 4-bar construction is hereby obtained consisting of the sleeve, the rigid connection and the first and second arms. This construction is collapsible due to the hinges at the corner points.

A drawback of the above stated 4-bar construction is however that a weak construction results during collapsing, whereby it may be difficult for a user to properly control the collapsing process and to readily predict the movements of the different components of the pram.

Other prams are known from FR 2 936 209 and CA 2 520 926. In these prams however, the distance between the front wheels and the rear wheels does not change during collapsing. While on the one hand the volume taken up by the pram after collapsing is hereby greater, on the other there is less of a problem, and urgency, in having to detach a seat part.

BRIEF SUMMARY

An object of the present invention is to provide a device wherein the above stated drawbacks do not occur, or hardly so. This object is achieved with the device according to the present invention, which is characterized in that the connector element is pivotally connected to one of the first or second arm and that the connector device further comprises a transmission between the connector element and the other of the first or second arm for the purpose of rotating the connector element during said pivoting of the pram from the folded-open position to the collapsed position.

Various embodiments of the present application are drawn to a device for transporting a child, such as a pram and/or buggy, comprising: a first wheel-bearing arm, an end of which is connected in bearing-mounted manner to a first wheel and another end of which is fixedly connected to a coupling housing; a second wheel-bearing arm, an end of which is connected in bearing-mounted manner to a second wheel and another end of which is coupled pivotally to the coupling housing, wherein the first and second wheel form respectively a front wheel and rear wheel or a rear wheel and front wheel of the device; a push bar for pushing the device along, which push bar is coupled pivotally at an end to the coupling housing; a connector device comprising a connector element configured for releasable coupling to a supporting device for a child such as a carrycot, a child's seat or a car seat; wherein the device is pivotable between a collapsed position, wherein the second arm and the push bar are rotated toward the first arm for the purpose of reducing a distance between the first and second wheel and for reducing the space taken up by the device, and a folded-open position corresponding to a position of use for the purpose of transporting the child; wherein the connector element is pivotally connected to one of the first or second arm and that the connector device further comprises a transmission between the connector element and the other of the first or second arm for the purpose of rotating the connector element during said pivoting of the pram from the folded-open position to the collapsed position.

Further embodiments are drawn to an assembly for transporting a child, comprising the device of the present application and a supporting device for a child such as a carrycot, a child's seat or a car seat, which supporting device can be coupled to the device by means of the connector element of the device.

DETAILED DESCRIPTION

Figure 1:
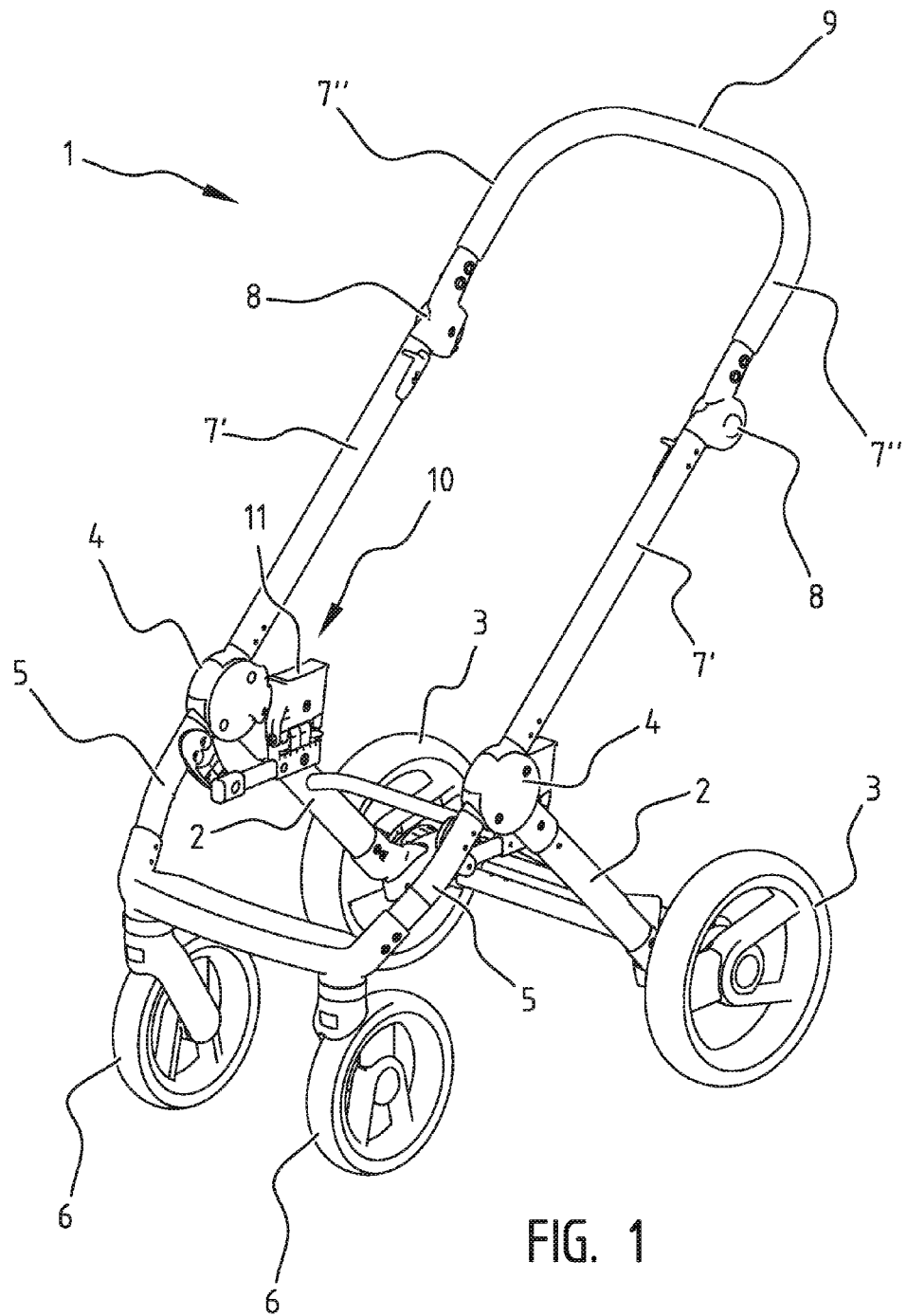
FIG. 1 shows an embodiment of a pram according to the present application in folded-open position.

Various embodiments of the present application are drawn to a device for transporting a child, such as a pram and/or buggy, comprising: a first wheel-bearing arm, an end of which is connected in bearing-mounted manner to a first wheel and another end of which is fixedly connected to a coupling housing; a second wheel-bearing arm, an end of which is connected in bearing-mounted manner to a second wheel and another end of which is coupled pivotally to the coupling housing, wherein the first and second wheel form respectively a front wheel and rear wheel or a rear wheel and front wheel of the device; a push bar for pushing the device along, which push bar is coupled pivotally at an end to the coupling housing; a connector device comprising a connector element configured for releasable coupling to a supporting device for a child such as a carrycot, a child's seat or a car seat; wherein the device is pivotable between a collapsed position, wherein the second arm and the push bar are rotated toward the first arm for the purpose of reducing a distance between the first and second wheel and for reducing the space taken up by the device, and a folded-open position corresponding to a position of use for the purpose of transporting the child; wherein the connector element is pivotally connected to one of the first or second arm and that the connector device further comprises a transmission between the connector element and the other of the first or second arm for the purpose of rotating the connector element during said pivoting of the pram from the folded-open position to the collapsed position.

The device according to the present application is characterized in that the connector element is pivotally connected to one of the first or second arm and that the connector device further comprises a transmission between the connector element and the other of the first or second arm for the purpose of rotating the connector element during said pivoting of the pram from the folded-open position to the collapsed position.

The pivoting between the folded-open and collapsed position can be simplified in advantageous manner by a toothed wheel or other type of transmission between the push bar and the second arm. This achieves that rotation of the push bar causes a comparable rotation of the second arm.

The position of a supporting device can be modified during collapsing because the connector element is pivotally mounted. The actual configuration of the transmission and the connector element determines the state or position in which the supporting device is located during or after collapse.

The transmission preferably comprises a coupling part pivotally connected to the other of the first or second arm, and a spacer element which is coupled slidably to one of the coupling part and the connector element and is connected fixedly to the other of the coupling part and the connector element. Together with the first and second arms the spacer element forms a triangular construction which increases the stiffness of the pram.

The coupling housing can comprise a first pivot point for pivoting of the second arm relative to the coupling housing and a second pivot point for pivoting of the push bar relative to the coupling housing. The first and second pivot points are placed spaced apart here, and the device further comprises a transmission between the push bar and the second arm such that a rotation of the push bar causes a comparable rotation of the second arm. The first and second pivot points are preferably placed at a fixed distance from each other. The push bar is preferably also rotated toward the first arm, at least during collapsing, and the transmission is configured to transmit the rotation of the push bar toward the first arm as a rotation of the second arm toward the first arm in opposite direction to the rotation of the push bar.

The connector device is preferably configured such that, in the collapsed position, the supporting device is or can be coupled in a direction away from the device. It is recommended that the second arm and push bar can be rotated toward the first arm such that these elements come to lie substantially in the same plane and that the supporting device remains coupled in a direction perpendicularly of this plane. A particularly favourable configuration is hereby achieved which takes up minimal space in the collapsed position, whereby the device according to the invention can be transported more easily, for instance in a car.

Additionally or alternatively, the connector element can also be configured for coupling to the supporting device in a coupling direction, wherein the connector device is configured so that in the collapsed position the coupling direction faces away from the device, for instance substantially perpendicularly of the arm on which the connector element is mounted.

The connector element is preferably mounted on the first arm and the coupling part on the second arm. During collapsing the first arm forms a rotating arm because of the fixed connection to the coupling housing. It is therefore advantageous for a relatively heavy supporting device to be connected to this arm. When the first wheel and the second wheel correspond to respectively a rear wheel and a front wheel, it is easier for a user to collapse the device because the coupling housing is fixedly connected to the rear wheel, whereby the situation is created that an element in front the coupling housing, i.e. the second arm, and an element behind the coupling housing, i.e. the push bar, have to be rotated for collapsing purposes.

The transmission preferably further comprises a spacer arm which is fixedly connected at an end to the second arm, wherein the coupling part is pivotally mounted on another end of the spacer arm. The spacer arm partially determines the final position of the supporting device here following collapsing.

The spacer element is preferably fixedly connected to the connector element, and is mounted slidably in the coupling part. The coupling part can here comprise a tubular element, a groove and/or slot in which the spacer element is slidably received.

The spacer element preferably comprises a stop for bounding the relative sliding movement between the spacer element and the coupling part, wherein a position in which the sliding movement is stopped by the stop corresponds to the folded-open position of the device. In this embodiment the stiffness of the device is increased further in that the stop partially absorbs downward forces on the supporting device, whereby the load on the coupling housing decreases. The coupling part is preferably confined here between the stop and the connector element.

The spacer element is preferably an elongate element such as a rod or beam.

The connector element preferably comprises two mutually pivotable parts, wherein one part is pivotally connected to the first arm and the second part can be coupled to the supporting device, and wherein the two parts are pivotally connected for inward rotation of the second part. The rotation axis of the second part lies here substantially in the same plane as the direction of forward movement of the pram. The second part can thus be rotated in a transverse direction of the pram. The advantage of such a construction of the connector element is that a second part of the element, which generally takes a relatively long form, can be rotated inward so that the volume taken up by the device in collapsed position decreases further. This is particularly advantageous when the pram is transported separately of the supporting device.

The first wheel and the second wheel are preferably respectively a rear wheel and a front wheel of the device. In the folded-open position the push bar preferably further lies substantially in line with the second arm.

The push bar preferably comprises a hinge which divides the push bar into two parts which can be rotated toward each other as part of collapsing of the device.

The push bar is provided with an operating element for unlocking the second arm and the push bar relative to the coupling housing. The push bar and the second arm can be pivoted after operation of such an element. In a further embodiment such operating elements can only be operated after the two parts of the push bar have been rotated relative to each other, for instance in that such elements only then become accessible to a user.

The device preferably comprises a pair of first and second arms disposed parallel relative to each other and a pair of push bars disposed parallel relative to each other, wherein the pair of first arms and the pair of second arms are each mutually connected by means of separate transverse connections. It will be apparent to the skilled person that it is recommended to give the device a symmetrical form.

Described above is how the connector element is connected in embodiments to the first arm and the coupling part to the second arm, and how the spacer element is arranged therebetween. It will be apparent to the skilled person that these elements can also be placed the other way around.

According to a second aspect, the invention also provides an assembly for transporting a child. Such an assembly comprises a device as described above and a supporting device for a child such as a carrycot, a child's seat or a car seat. This supporting device can be coupled to the device by means of the connector element of the device.

The present invention will be further elucidated hereinbelow with reference to the accompanying figures.

FIG. 1 shows an embodiment of a pram 1 according to the invention. Pram 1 comprises a first wheel-bearing arm 2, an end of which is connected in bearing-mounted manner to a first wheel 3 and another end of which is fixedly connected to a coupling housing 4. Pram 1 further comprises a second wheel-bearing arm 5, an end of which is connected in bearing-mounted manner to a second wheel 6 and another end of which is pivotally connected to coupling housing 4.

Pram 1 is provided with a push bar consisting of two parts 7' and 7" which can pivot by means of hinge 8. In FIG. 1 the parts 7" associated with the left and right-hand side of pram 1 are connected by a U-shaped tube 9. Parts 7', 7" can here be formed integrally in combination with tube 9 for both sides of the pram.

Figure 2:
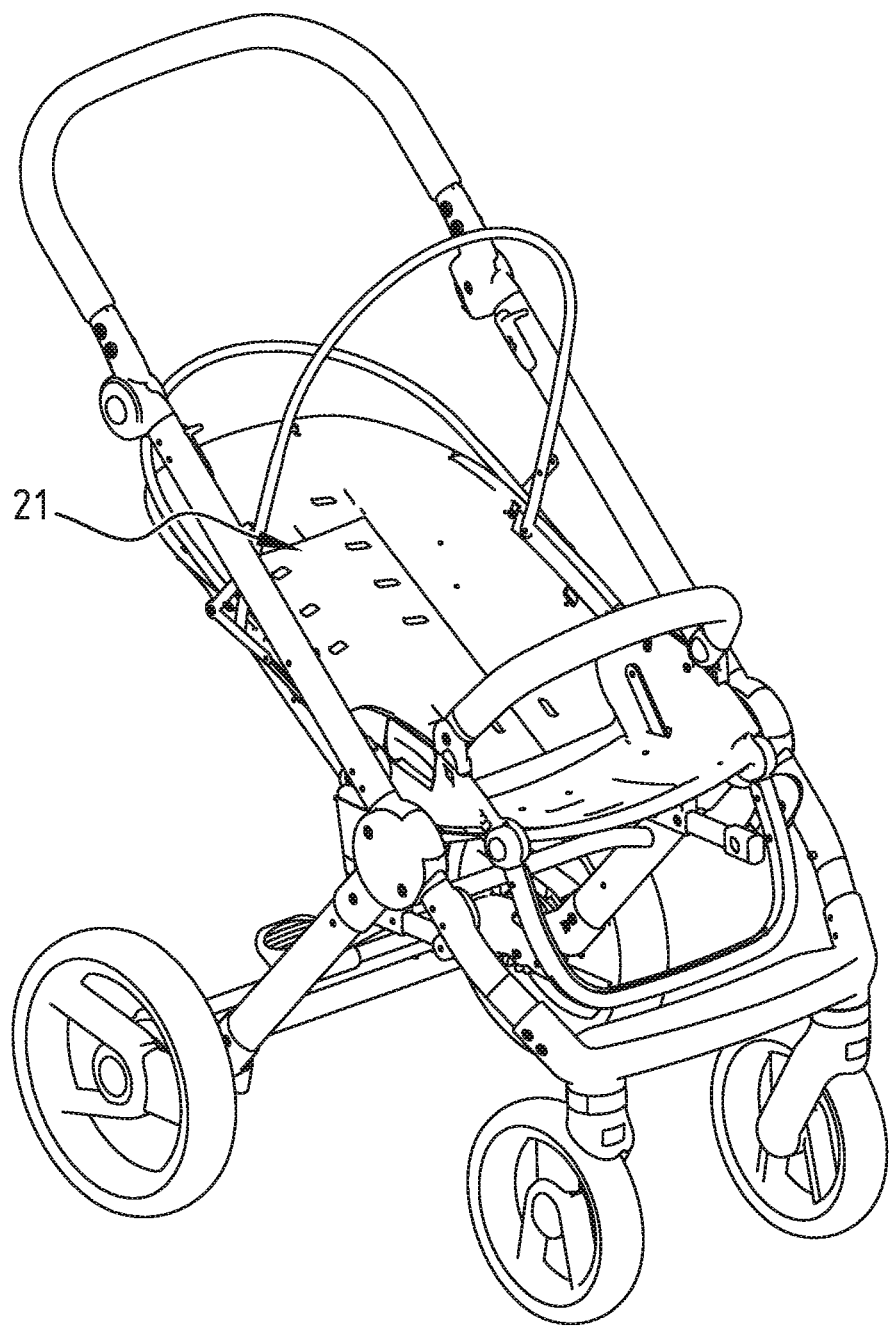
FIG. 2 shows the embodiment of FIG. 1, wherein a child's seat is coupled to the pram.

Pram 1 also comprises a connector device 10 comprising a connector element 11 configured for releasable coupling to a supporting device. An example of such a device is a child's seat 21 as shown in FIG. 2.

Figure 3:
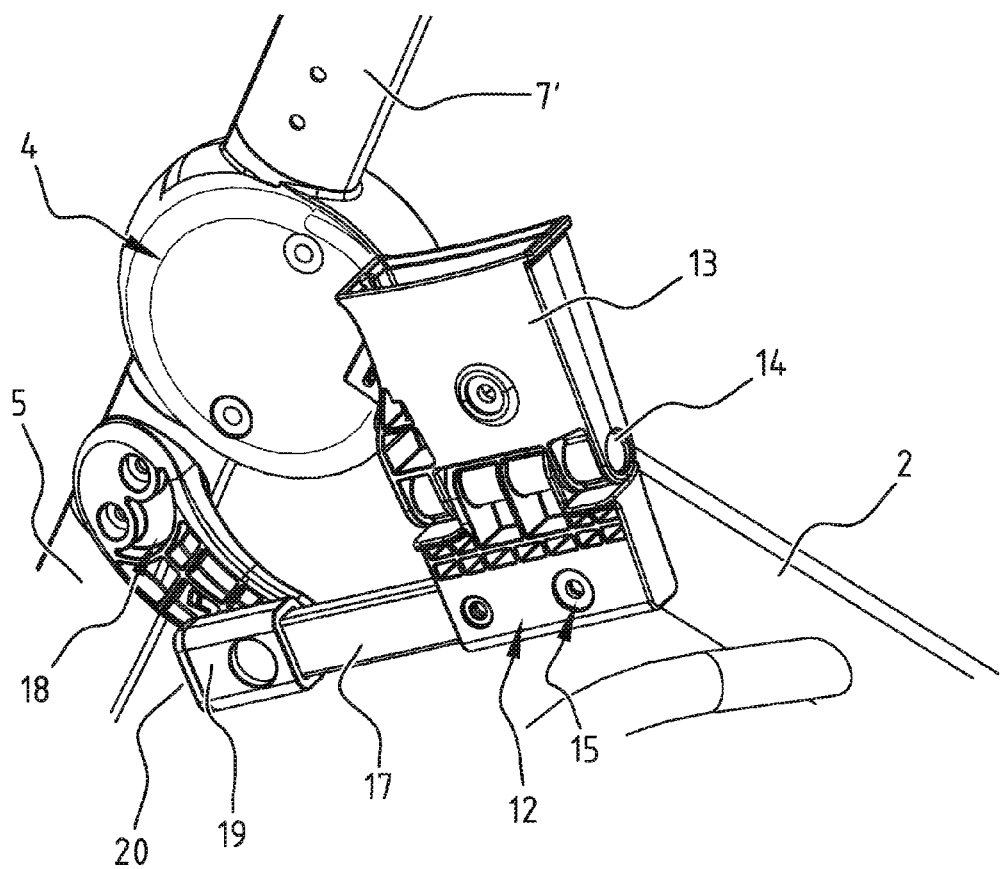
FIG. 3 shows a detailed view at the position of the connector element.

Connector device 10 is shown in more detail in FIG. 3. Connector element 11 here comprises two parts 12, 13 which are pivotable by means of hinge 14. Part 12 of connector element 11 is further connected pivotally to first arm 2. Connector device 10 further comprises a transmission between second arm 5 and connector element 11. This transmission comprises a spacer arm 18, a coupling part 19 and a spacer element 17. Coupling part 19 is pivotally connected here to spacer arm 18, which is in turn connected fixedly to second arm 5. Spacer element 17 is coupled slidably to coupling part 19 and connected fixedly to part 12 of connector element 11. Spacer element 17 is further provided at an end with a stop 20 which defines the extreme position between first arm 2 and second arm 5. This position corresponds to the folded-open position.

FIG. 3 shows the triangular construction between first arm 2, second arm 5 and spacer element 17 via spacer arm 18, which construction enhances the stiffness of pram 1.

Figure 4A:
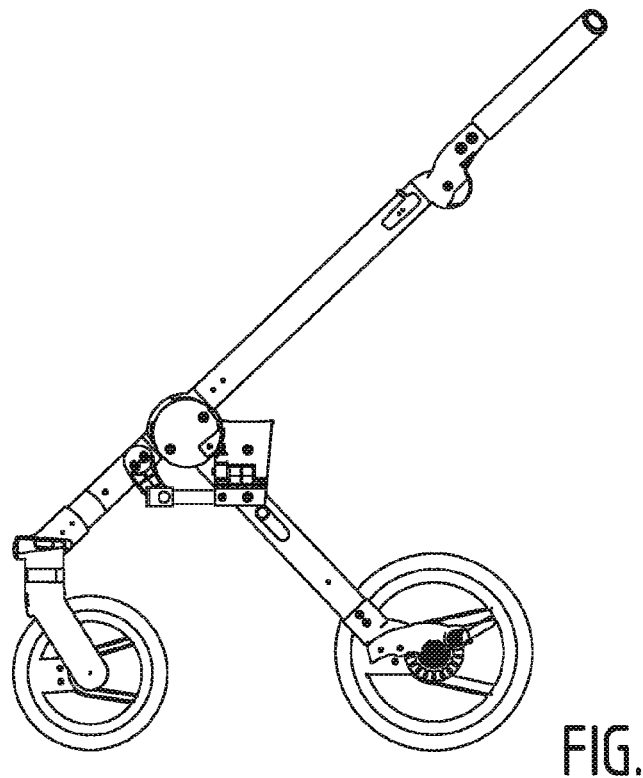
FIG. 4A shows the pram of FIG. 1 in a folded open position.
Figure 4B:
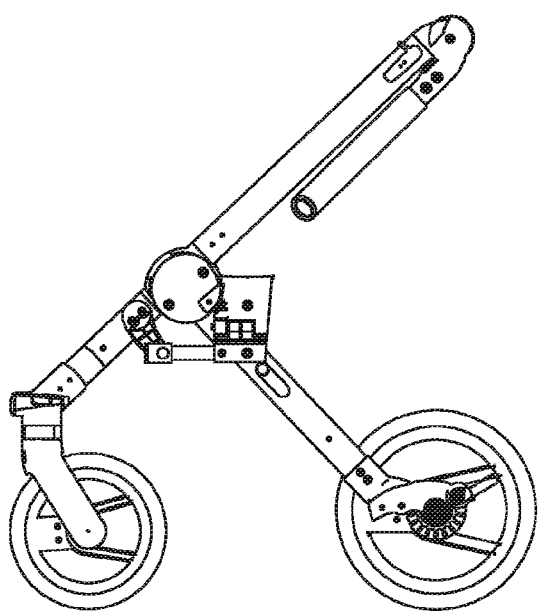
FIG. 4B shows collapsing of the pram of FIG. 1, wherein parts of the push bar are pivoted relative to each other.
Figure 4C:
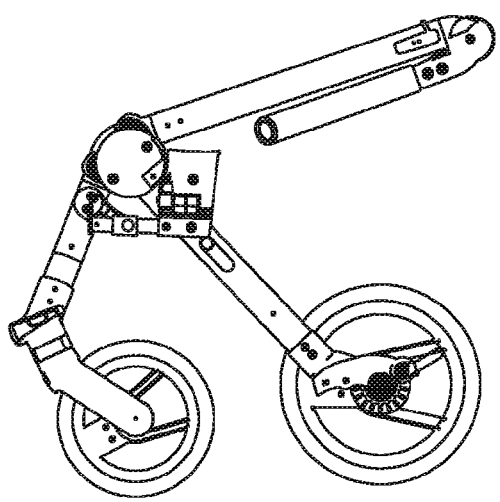
FIG. 4C shows collapsing of the pram of FIG. 1.
Figure 4D:
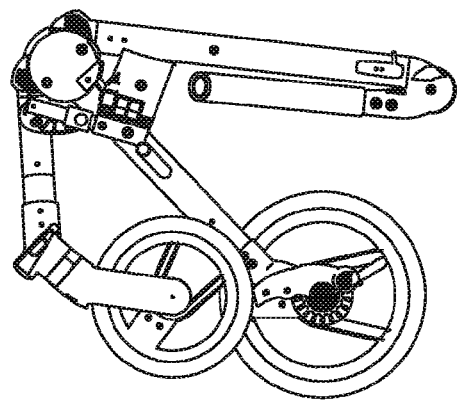
FIG. 4D shows collapsing of the pram of FIG. 1.
Figure 4E:
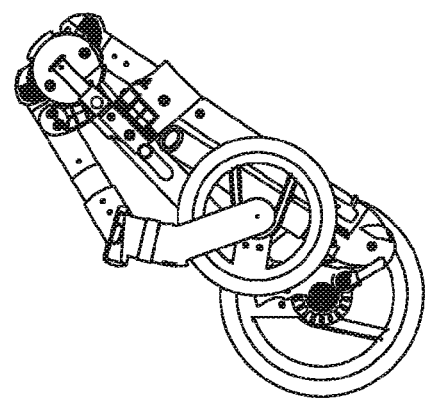
FIG. 4E shows collapsing of the pram of FIG. 1.

FIGS. 4A-4E show the collapsing of pram 1. Firstly (FIG. 4B) parts 7', 7" of the push bar are pivoted relative to each other. This makes available an operating element (not shown) with which a user can unlock second arm 5 and push bar part 7' relative to coupling housing 4. The push bar and second arm 5 can hereby be moved toward each other (FIGS. 4C-4E). During this movement spacer element 17 slides into coupling part 19 and coupling part 19 and connector element 11 rotate in order to allow this sliding movement. The orientation of connector element 11 changes here relative to first arm 2.

Figure 5:
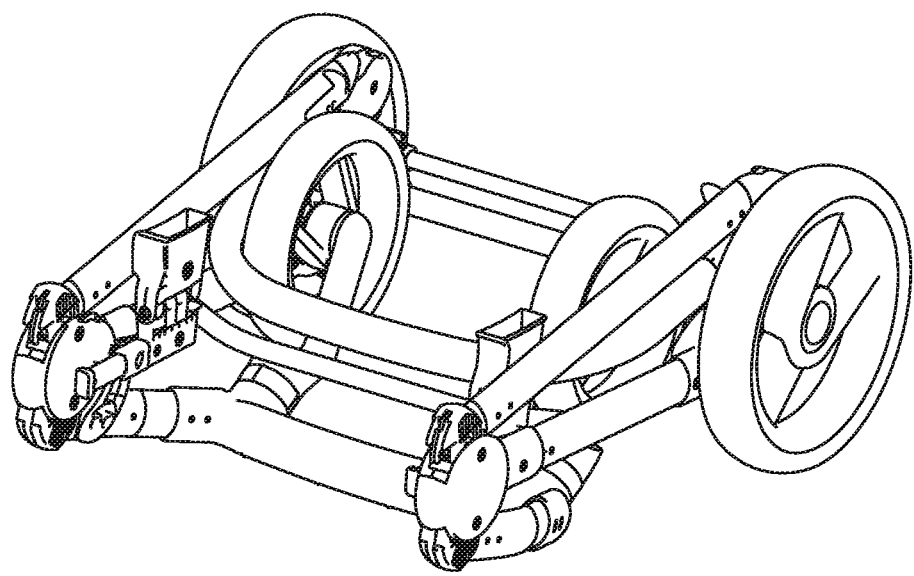
FIG. 5 shows a detailed view of the pram of FIG. 1 in collapsed position.

FIG. 5 shows a fully collapsed pram 1. It follows from this figure that a suitable design of spacer arm 18, spacer element 17 and connector element 11 enables a coupling direction of connector element 11 to face away from pram 1. This is because child's seat 21 can be or remain coupled in the collapsed position. It is usually not therefore necessary with the pram according to the present invention to remove the supporting device prior to collapsing. The pram and the child's seat can hereby be transported as one whole.

In FIG. 5 the parts 12, 13 of connector 11 have not yet been pivoted. Part 13 can optionally rotate in a transverse direction so that it does not protrude outward, and the volume taken up by pram 1 decreases further still.

The invention has been discussed in the foregoing on the basis of an embodiment thereof. It will be apparent to the skilled person that various modifications are possible without departing from the scope of protection of the invention as defined by the following claims.

The invention claimed is:

1. Device for transporting a child comprising:
   a first wheel-bearing arm, an end of which is connected in bearing-mounted manner to a first wheel and another end of which is fixedly connected to a coupling housing;
   a second wheel-bearing arm, an end of which is connected in bearing-mounted manner to a second wheel and another end of which is coupled pivotally to the coupling housing, wherein the first and second wheel form, respectively, a front wheel and rear wheel or a rear wheel and front wheel of the device;

a push bar for pushing the device along, which push bar is coupled pivotally at an end to the coupling housing;

a connector device comprising a connector element configured for releasable coupling to a supporting device for a child;

wherein the device is pivotable between a collapsed position, wherein the second wheel-bearing arm and the push bar are rotated toward the first wheel-bearing arm for the purpose of reducing a distance between the first and second wheel and for reducing the space taken up by the device, and a folded-open position corresponding to a position of use for the purpose of transporting the child;

wherein the connector element is pivotally connected to one of the first or second wheel-bearing arms and the connector device further comprises a transmission between the connector element and the first or second wheel-bearing arm, such that the connector element is capable of rotating during said pivoting of the device from the folded-open position to the collapsed position.

2. Device as claimed in claim 1, wherein the coupling housing comprises a first pivot point for pivoting of the second wheel-bearing arm relative to the coupling housing and a second pivot point for pivoting of the push bar relative to the coupling housing, wherein the first and second pivot points are placed at a fixed distance from each other.

3. Device as claimed in claim 2, wherein rotation of the push bar about the coupling housing causes a comparable rotation of the second wheel-bearing arm about the coupling housing.

4. Device as claimed in claim 3, wherein the push bar is rotated toward the first wheel-bearing arm, at least during collapsing of the device, and wherein rotation of the push bar toward the first wheel-bearing arm causes rotation of the second wheel-bearing arm toward the first wheel-bearing arm in a direction opposite to the rotation of the push bar.

5. Device as claimed in claim 1, wherein the transmission of the connector device comprises a coupling part that is capable of pivoting with respect to the first or second wheel-bearing arm which is not pivotally connected to the connector element, and a spacer element which is coupled slidably to one of the coupling part and the connector element and is connected fixedly to the other of the coupling part and the connector element.

6. Device as claimed in claim 5, wherein the connector element is mounted on the first wheel-bearing arm and the coupling part is mounted on the second wheel-bearing arm.

7. Device as claimed in claim 6, wherein the transmission of the connector device further comprises a spacer arm which is fixedly connected at an end to the second wheel-bearing arm, wherein the coupling part is pivotally mounted on another end of the spacer arm.

8. Device as claimed in claim 7, wherein the spacer element is fixedly connected to the connector element and is mounted slidably in the coupling part.

9. Device as claimed in claim 8, wherein the coupling part comprises a tubular element, a groove, a slot, or a combination thereof in which the spacer element is slidably received.

10. Device as claimed in claim 5, wherein the spacer element comprises a stop for bounding the relative sliding movement between the spacer element and the coupling part, wherein a position in which the sliding movement is stopped by the stop corresponds to the folded-open position of the device.

11. Device as claimed in claim 10, wherein the coupling part is confined between the stop and the connector element.

12. Device as claimed in claim 5, wherein the spacer element is an elongate element.

13. Device as claimed in claim 1, wherein the connector element comprises two mutually pivotable parts, wherein one part is pivotally connected to the first wheel-bearing arm and the second part is capable of being coupled to the supporting device, and wherein the two parts are pivotally connected for inward rotation of the second part.

14. Device as claimed in claim 1, wherein the first wheel and the second wheel are, respectively, a rear wheel and a front wheel of the device.

15. Device as claimed in claim 1, wherein, in the folded-open position, the push bar lies substantially in-line with the second wheel-bearing arm.

16. Device as claimed in claim 1, wherein the push bar comprises a hinge which divides the push bar into two parts which are capable of being rotated toward each other as part of collapsing of the device.

17. Device as claimed in claim 1, wherein the device comprises a pair of first and second arms disposed parallel relative to each other and a pair of push bars disposed parallel relative to each other, wherein the pair of first arms and the pair of second arms are each mutually connected by means of separate transverse connections.

18. Assembly for transporting a child, the assembly comprising the device as claimed in claim 1 and a supporting device for a child, wherein the supporting device is capable of being coupled to the device by means of the connector element of the device.

19. Device as claimed in claim 1, wherein the connector device is configured such that, in the collapsed position of the device, the supporting device is or is capable of being coupled in a direction away from the device.

20. Device as claimed in claim 1, wherein the connector element is configured for coupling to the supporting device in a coupling direction, and wherein the connector device is configured so that, in the collapsed position of the device, the coupling direction faces away from the device.

* * * * *